United States Patent
Yasuda et al.

(10) Patent No.: US 7,351,362 B2
(45) Date of Patent: Apr. 1, 2008

(54) PHOTOCHROMIC MATERIAL

(75) Inventors: Michiyuki Yasuda, Nagoya (JP); Jun Sugai, Nagoya (JP); Fumihiro Kimura, Nagoya (JP)

(73) Assignee: The Pilot Ink Co., Ltd., Aichi (JP)

(*) Notice: Subject to any disclaimer, the term of this patent is extended or adjusted under 35 U.S.C. 154(b) by 349 days.

(21) Appl. No.: 10/892,156

(22) Filed: Jul. 16, 2004

(65) Prior Publication Data

US 2005/0012081 A1   Jan. 20, 2005

(30) Foreign Application Priority Data

Jul. 17, 2003  (JP)  ............ P. 2003-275721
May 26, 2004  (JP)  ............ P. 2004-155787

(51) Int. Cl.
  *G02B 5/23*  (2006.01)
  *C09K 9/02*  (2006.01)
  *C08K 5/35*  (2006.01)
  *G03C 1/66*  (2006.01)

(52) U.S. Cl. .......... 252/582; 252/586; 428/913; 430/138; 430/270.1; 524/87; 524/95

(58) Field of Classification Search ........ 252/582, 252/586; 428/913; 430/270.1, 138; 524/87, 524/95
See application file for complete search history.

(56) References Cited

U.S. PATENT DOCUMENTS 4,705,046 A * 11/1987 Robillard ............ 600/477
4,720,356 A    1/1988 Chu
5,221,288 A * 6/1993 Kamada et al. ........ 8/554
5,236,958 A * 8/1993 Miyashita ............ 548/121
5,241,027 A * 8/1993 Miyashita ............ 526/259
5,266,447 A   11/1993 Takahashi et al.

FOREIGN PATENT DOCUMENTS

| BE | 1 007 885 A | 11/1995 |
| EP | 0 092 776 A2 | 11/1983 |
| EP | 0 442 166 A1 | 8/1991 |
| EP | 0 931 278 A | 7/1999 |
| JP | 5-25472 A | 2/1993 |
| JP | 7-216350 A | 8/1995 |
| WO | WO 96/30357 A1 | 10/1996 |
| WO | WO 99/43666 A1 | 9/1999 |

OTHER PUBLICATIONS

Lin et al. "Interaction between dispersed photochromic compound and polymer matrix", European Polymer Journal, vol. 39, 2003, pp. 1693-1700.*
XP-002304877 (1994) Derwent Publications Ltd.—Abstract.
XP-002304878 (2000) Derwent Publications Ltd.—Abstract.
XP-002304879 (1992) Derwent Publications Ltd.—Abstract.
European Search Report dated Nov. 18, 2004.

* cited by examiner

*Primary Examiner*—Shean C Wu
(74) *Attorney, Agent, or Firm*—Sughrue Mion, PLLC

(57) ABSTRACT

A photochromic material comprising a styrene-based oligomer having a weight average molecular weight of from 200 to 6000 and a photochromic compound selected from the group consisting of spirooxazine derivatives and spiropyran derivatives.

8 Claims, No Drawings

PHOTOCHROMIC MATERIAL

FIELD OF THE INVENTION

The present invention relates to a photochromic material. And more specifically, it relates to a photochromic material in which a photochromic compound is improved with respect to light fastness and coloration density.

BACKGROUND ART

Conventionally, as a photochromic material improved with respect to light fastness, one comprising a photochromic compound incorporated with an N-nitrosophenyl-based compound (See, for example, patent reference 1.), one added with an organic phosphorous acid ester compound and a hindered phenol (See, for example, patent reference 2.) and one added with a specified tertiary amine compound (See, for example, patent reference 3.) are disclosed.

| [Patent Reference 1] | JP-A-5-25472 |
| [Patent Reference 2] | JP-A-7-216350 |
| [Patent Reference 3] | U.S. Pat. No. 5,266,447 |

SUMMARY OF THE INVENTION

By confirming the practical applicability of the aforementioned, conventional photochromic compounds, it was seen that, though having the effect of improving light fastness, those techniques tend to cause the problem of color density decrease, thus deteriorating the practical applicability.

As a result of the light fastness improving study by the inventors, it has been found that a photochromic material is obtained with improved light fastness as well as coloration density by dissolving a photochromic compound in a specified styrene-based oligomer.

Namely, the essential condition of the invention is indicated as below.

(1) Photochromic material comprising a styrene-based oligomer having a weight average molecular weight of from 200 to 6000 and a photochromic compound selected from the group consisting of spirooxazine derivatives and spiropyran derivatives.

(2) The photochromic material according to the above (1), wherein the photochromic compound is dissolved in the styrene-based oligomer.

(3) The photochromic material according to the above (1) or (2), wherein the weight ratio of said photochromic compound to the styrene-based oligomer lies between 1:1 and 1:10000.

(4) The photochromic material according to any one of the above (1) to (3), wherein the weight average molecular weight of said styrene-based oligomer is from 200 to 4000.

(5) The photochromic material according to any one of the above (1) to (4), which further comprises an organic compound which has at least one functional groups each selected from the group consisting of a hydroxy group, an ester group and a carboxyl group, wherein the boiling point of the organic compound is 150° C. or higher, and the melting point or a softening point of the organic compound does not exceed 150° C., and wherein the organic compound is incorporated in the styrene-based oligomer in an amount of 50 parts by weight based on 100 parts by weight of the oligomer.

(6) The photochromic material according to any one of the above (1) to (5), which further comprises a hindered amine-based light stabilizer.

(7) The photochromic material according to the above (6), wherein said hindered amine-based light stabilizer is a compound represented by the following formula (1):

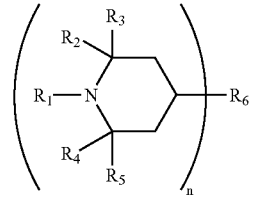

wherein, $R_1$ represents an alkyl group having 1 to 30 carbon atoms, $R_2$, $R_3$, $R_4$ and $R_5$ each represents an alkyl group having 1 to 5 carbon atoms, n represents an integer not smaller than 1, and $R_6$ represents an n-valent organic residue.

(8) The photochromic material according to any one of the above (1) to (7), wherein said photochromic compound and styrene-based oligomer are encapsulated in microcapsules.

(9) The photochromic material according to any one of the above (1) to (7), wherein said photochromic compound and styrene-based oligomer are dispersed in resin particles.

The invention can provide a photochromic material which has few limitations for manufacture and excelling in the applicability to any use field, since not only light fastness is improved to such an extent as conventional photochromic materials have never achieved, but also the enhancement of coloration density and water resistance can be imparted.

DETAILED DESCRIPTION OF THE INVENTION

The aforementioned photochromic compound chosen from spirooxazine derivatives or spiropyran derivatives is used by dissolving in a styrene-based oligomer.

The aforementioned styrene-based oligomer has a weight average molecular weight of from 200 to 6000, and preferably from 200 to 4000.

In the case where the weight average molecular weight of the styrene-based oligomer is below 200, the content of the monomer is undesirably high, and lacks in stability. Hence, the light fastness-enhancing effect is difficult to develop.

And when the weight average molecular weight exceeds 6000, a residual color occurs by light irradiation, at the same time, the coloration density becomes low, and discoloration sensitivity becomes dull.

Meanwhile, weight average molecular weight is measured by the GPC method (gel permeation chromatography).

As the aforementioned styrene-based oligomer, low molecular weight polystyrene, styrene-α-methylstyrene copolymer, α-methylstyrene polymer, α-methylstyrene/vinyltoluene copolymer, α-pinene polymer, β-pinene polymer and d-limonene polymer are mentioned.

As the low molecular weight polystyrene, those made by Sanyo Chemical Industries, Ltd. with a trade name of Hymer SB-75 (weight average molecular weight=2000), and with a trade name of Hymer ST-95 (weight average molecular weight=4000) can be used.

As the styrene-α-methylstyrene copolymer, those made by Rika Hercules Co., Ltd. with a trade name of Piccolastic A5 (weight average molecular weight=317), and with a trade name of Piccolastic A75 (weight average molecular weight=917) can be used.

As the α-methylstyrene polymer, those made by Rika Hercules Co., Ltd. with a trade name of Crystalex 3085 (weight average molecular weight=664), with a trade name of Crystalex 3100 (weight average molecular weight=1020), and with a trade name of Crystalex 1120 (weight average molecular weight=2420), can be used.

As the α-methylstyrene/vinyltoluene copolymer, those made by Rika Hercules Co., Ltd.with a trade name of Piccotex LC (weight average molecular weight=950), and with a trade name of Piccotex 100 (weight average molecular weight=1740) can be used.

As the α-pinene polymer, one made by Rika Hercules Co., Ltd. with a trade name of Piccolite A115 (weight average molecular weight=833) can be used.

As the β-pinene polymer, one made by Rika Hercules Co., Ltd. with a trade name of Piccolite S115 (weight average molecular weight=1710) can be used.

As the d-limonene polymer, one made by Rika Hercules Co., Ltd. with a trade name of Piccolite C115 (weight average molecular weight=902) can be used.

The aforementioned styrene-based oligomer may be used individually or in combination of two or more.

Among the aforementioned photochromic compounds, spirooxazine derivatives are shown below. But the invention should not be limited thereto at all.

As indolinospirobenzooxazine-based compounds, those in which the indole ring and benzene ring of indolinospirobenzooxazine are substituted with a halogen, methyl, ethyl, methylene, ethylene or hydoxy group are mentioned including, 1,3,3-trimethylspiro[2H-indole-2,3'-[3H]pyrido[4,3-f][1,4]benzooxazine],
6'-chloro-5-fluoro-1,3,3-trimethylspiro[2H-indole-2,3'-[3H]pyrido[4,3-f][1,4]benzooxazine],
3,3-dimethyl-1-ethylspiro[2H-indole-2,3'-[3H]pyrido[4,3-f][1,4)benzooxazine],
5,7-difluoro-1,3,3-trimethylspiro[2H-indole-2,3'-[3H]pyrido[4,3-f)[1,4]benzooxazine),
5-cyano-3,3-dimethyl-1-(methoxycarbonyl)methylspiro[2H-indole-2,3'-[3H]pyrido[4,3-f][1,4]benzooxazine],
1'-methyldispiro[cyclohexane-1,3'-[3H]indole-2'(1'H),3"-[3H]pyrido[4,3-f][1,4]benzooxazine],
1'-methyl-5'-nitrodispiro[cyclopentane-1,3'-[3H]indole-2'(1'H),3"-[3H]pyrido[4,3-f][1,4]benzooxazine],
1,3,3,5'-tetramethylspiro[2H-indole-2,3'-[3H]pyrido[4,3-f][1,4]benzooxazine],
6'-fluoro-1'-methyldispiro[cyclohexane-1,3'-[3H]indole-2'(1'H),3"-[3H]pyrido[4,3-f][1,4]benzooxazine],
1-benzyl-6'-chloro-3,3-dimethylspiro[2H-indole-2,3'-[3H]pyrido[4,3-f][1,4]benzooxazine],
6'-methoxy-1,3,3-trimethylspiro[2H-indole-2,3'-[3H]pyrido[4,3-f][1,4]benzooxazine],
5-chloro-1,3,3-trimethylspiro[2H-indole-2,3'-[3H]pyrido[4,3-f][1,4]benzooxazine],
5-bromo-1,3,3-trimethylspiro[2H-indole-2,3'-[3H]pyrido[4,3-f][1,4]benzooxazine],
5-iodo-1,3,3-trimethylspiro[2H-indole-2,3'-[3H]pyrido[4,3-f][1,4]benzooxazine],
5-trifluoromethyl-1,3,3-trimethylspiro[2H-indole-2,3'-[3H]pyrido[4,3-f][1,4]benzooxazine],
3,3-diethyl-1-methylspiro[2H-indole-2,3'-[3H]pyrido[4,3-f][1,4]benzooxazine],
1,3,3,6'-tetramethylspiro[2H-indole-2,3'-[3H]pyrido[4,3-f][1,4]benzooxazine],
6-chloro-1,3,3-trimethylspiro[2H-indole-2,3'-[3H]pyrido[4,3-f][1,4]benzooxazine],
5'-fluoro-1'-methyldispiro[cyclohexane-1,3'-[3H]indole-2'(1'H),3"-[3H]pyrido[4,3-f][1,4]benzooxazine],
5-cyano-1,3,3-trimethylspiro[2H-indole-2,3'-[3H]pyrido[4,3-f][1,4]benzooxazine],
5-ethoxycarbonyl-1,3,3-trimethylspiro[2H-indole-2,3'-[3H]pyrido[4,3-f][1,4]benzooxazine],
4',6'-difluoro-1'-methyldispiro[cyclohexane-1,3'-[3H]indole-2'(1'H),3"-[3H]pyrido[4,3-f][1,4]benzooxazine],
3,3-dimethyl-1-(methoxycarbonyl)methylspiro[2H-indole-2,3'-[3H]pyrido[4,3-f][1,4]benzooxazine],
3,3-dimethyl-1-phenylspiro[2H-indole-2,3'-[3H]pyrido[4,3-f][1,4]benzooxazine],
5-methoxy-1,3,3-trimethylspiro[2H-indole-2,3'-[3H]pyrido[4,3-f][1,4]benzooxazine],
1,3,3,5-tetramethylspiro[2H-indole-2,3'-[3H]pyrido[4,3-f][1,4]benzooxazine],
7-chloro-1,3,3-trimethylspiro[2H-indole-2,3'-[3H]pyrido[4,3-f][1,4]benzooxazine],
1,3,3,7'-tetramethylspiro[2H-indole-2,3'-[3H]pyrido[4,3-f][1,4]benzooxazine],
7'-methoxy-1,3,3-trimethylspiro[2H-indole-2,3'-[3H]pyrido[4,3-f][1,4]benzooxazine],
1,3,3-trimethylspiro[2H-indole-2,3'-[3H]pyrido[2,3-f][1,4]benzooxazine],
6'-chloro-5-fluoro-1,3,3-trimethylspiro[2H-indole-2,3'-[3H]pyrido[2,3-f][1,4]benzooxazine],
5-chloro-1,3-dimethyl-3-ethyl-5'-methoxyspiro[2H-indole-2,3'-[3H]pyrido[2,3-f][1,4]benzooxazine],
3,3-diethyl-1-methyl-5-nitrospiro[2H-indole-2,3'-[3H]pyrido[2,3-f][1,4]benzooxazine],
1',6'-dimethylspiro[cyclohexane-1,3'-[3H]indole-2'(1'H),3"-[3H]pyrido[2,3-f][1,4]benzooxazine],
9"-bromo-1'-methoxycarbonylmethyl-5'-trifluoromethyldispiro[cyclopentane-1,3'-[3H]-indole-2'(1'H),3"-[3H]pyrido[2,3-f][1,4]benzooxazine],
1-benzyl-3,3-di-n-butyl-7'-ethyl-5-methoxyspiro[2H-indole-1,3'-[3H]pyrido[2,3-f][1,4]benzooxazine],
1'-n-butyl-6'-iododispiro[syclohepan-1,3'-]3H]-indole-2'(1'H),3"-[3H]pyrido[2,3-f][1,4]benzooxazine],
3,3-dimethyl-9'-iodo-1-naphthylspiro[2H-indole-2,3'-[3H]pyrido[2,3-f][1,4]benzooxazine],
4'-cyano-1'-(2-(methoxycarbonyl)ethyl)dispiro[cyclohexane-1,3'-[3H]indole-2'(1'H),3"-[3H]pyrido[2,3-f][1,4]benzooxazine],
7-methoxycarbonyl-1,3,3-trimethylspiro[2H-indole-2,3'-[3H]pyrido[2,3-f][1,4]benzooxazine],
4-bromo-3,3-diethyl-9'-ethoxy-1-(2-phenyl)ethylspiro[2H-indole-2,3'-[2,3-f][1,4]benzooxazine],
1'-methyldispiro[cyclohexane-1,3'-[3H]-indole-2'(1'H),3"-[3H]pyrido[2,3-f][1,4]benzooxazine],
6-fluoro-1,3,3-trimethylspiro[2H-indole-2,3'-[3H]pyrido[2,3-f][1,4]benzooxazine],
5-ethyl-9-fluoro-1,3,3-trimethylspiro[2H-indole-2,3'-[3H]pyrido[2,3-f][1,4]benzooxazine],
1'-benzyl-6"-iododispiro[cyclopentane-1,3'-[3H]-indole-2'(1'H),3"-[3H]pyrido[2,3-f][1,4]benzooxazine,
5-ethoxy-1,3,3-trimethylspiro[2H-indole-2,3'-[3H]pyrido[2,3-f][1,4]benzooxazine],
1'-methyl-5'-trichloromethyldispiro[cyclohexane-1,3'-[3H]-indole-2'(1'H),3"-[3H]pyrido[2,3-f][1,4]benzooxazine],
1,3-diethyl-3-methylspiro[2H-indole-2,3'-[3H]pyrido[2,3-f][1,4]benzooxazine, and
1'-methoxycarbonylmethyldispiro[cyclohexane-1,3'-[3H]-indole-2'(1'H)-[3H]pyrido[2,3-f][1,4]benzooxazine).

As indolinospironaphthooxazine-based compounds, those in which the indole ring and benzene ring of indolinospironaphthooxazine are substituted with a halogen, methyl, ethyl, methylene, ethylene or hydroxy group are mentioned, including 1,3,3-trimethyl-spiroindolinenaphthooxazine,
1,3,3-trimethyl-5-chloro-spiroindolinenaphthooxazine,
1,3,3-trimethyl-5-bromo-spiroindolinenaphthooxazine,
1,3,3,5-tetramethyl-spiroindolinenaphthooxazine,
1,3,3-trimethyl-5-n-propyl-spiroindolinenaphthooxazine,
1,3,3-trimethyl-5-iso-butyl-spiroindolinenaphthooxazine,
1,3,3-trimethyl-5-methoxy-spiroindolinenaphthooxazine,
1,3,3-trimethyl-5-n-propoxy-spironaphthooxazine,
1,3,3-trimethyl-5-cyano-spiroindolinenaphthooxazine,
1-n-ethyl-3,3-dimethyl-spiroindolinenaphthooxazine,
1-n-propyl-3,3-dimethyl-spiroindolinenaphthooxazine,
1-iso-butyl-3,3-dimethyl-spiroindolinenaphthooxazine,
1-n-octyl-3,3-dimethyl-spiroindolinenaphthooxazine,
1-n-octadecyl-3,3-dimethyl-spiroindolinenaphthooxazine,
1,3,3-trimethyl-8'-sodium sulfonate-spiroindolinenaphthooxazine,
1,3,3-trimethyl-9'-methoxyspiroindolinenaphthooxazine,
1,3,3-trimethyl-5-trifluoro-spiroindolinenaphthooxazine,
1-benzyl-3,3-dimethyl-spironaphthooxazine,
1-(4'-methylphenyl)-3,3-dimethyl-spironaphthooxazine,
1,3,3-trimethyl-6'-(2,3-dihydro-1-indolino)-spiroindolinenaphthooxazine,
1,3,3-trimethyl-6'-(1-piperidinyl)-spiroindolinenaphthooxazine,
1,3,3-trimethyl-6-trifluoromethyl-6'-(1-piperidinyl)-spiroindolinenaphthooxazine,
1-benzyl-3,3-dimethyl-spiroindolinenaphthooxazine,
1-(4-methoxybenzyl)-3,3-dimethyl-spiroindolinenaphthooxazine,
1-(4-chlorobenzyl)-3,3-dimethyl-spiroindolinenaphthooxazine, 1-ethyl-3,3-dimethyl-spiroindolinenaphthooxazine,
1-isopropyl-3,3-dimethyl-spiroindolinenaphthooxazine,
1-(2-phenoxyethyl)-3,3-dimethyl-spiroindolinenaphthooxazine, 1,3-dimethyl-3-ethyl-spiroindolinenaphthooxazine,
1,3,3-trimethyl-9'-hydroxy-spiroindolinenaphthooxazine,
1,3-dimethyl-3-ethyl-8'-hydroxy-spiroindolinenaphthooxazine,
1,3,3,5-tetramethyl-9'-methoxy-spiroindolinenaphthooxazine,
1,3,3,5,6-pentamethyl-9'-methoxy-spiroindolinenaphthooxazine,
1,3,3-trimethyl-4-trifluoromethyl-5'-methoxy-spiroindolinenaphthooxazine,
1,3,3-trimethyl-5'-methoxy-6'-trifluoromethyl-spiroindolinenaphthooxazine,
1,3,3-trimethyl-4-trifluoromethyl-9'-methoxy-spiroindolinenaphthooxazine,
1,3,5,6-tetramethyl-3-ethyl-spiroindolinenaphthooxazine,
1.3.3.5.6-pentamethyl-spiroindolinenaphthooxazine,
1-methyl-3,3-diphenyl-spiroindolinenaphthooxazine,
1-(4-methoxybenzyl)-3,3-dimethyl-spiroindolinenaphthooxazine,
1-(3,5-methylbenzyl)-3,3-dimethyl-spiroindolinenaphthooxazine, and
1-(2-fluorobenzyl)-3,3-dimethyl-spiroindolinenaphthooxazine.

As the example of indolinospirophenanthrooxazine-based compound, those in which the indole ring and benzene ring of indolinospirophenanthrooxazine are substituted with a halogen, methyl, ethyl, methylene, ethylene or a hydroxy group are mentioned, including 1,3,3-trimethyl-spiroindolinephenanthrooxazine, and
1,3,3-trimethyl-5-chloro-spiroindolinephenanthrooxazine.

As the example of indolinospiroquinolinooxazine-based compound, those in which the indole ring and benzene ring of indolinospirophenanthrooxazine are substituted with a halogen, methyl, ethyl, methylene, ethylene or hydroxy group are mentioned, including 1,3,3-trimethyl-spiroindolinequinolinooxazine.

Among the aforementioned photochromic compounds, spiropyran derivatives are shown below, but the invention is not limited to those.

1,3,3-trimethylindolinobenzopyrylospiran,
1,3,3-trimethylindo-6'-bromobenzopyrylospiran,
1,3,3-trimethylindolino-8-methoxybenzopyrylospiran,
1,3,3-trimethylindolino-β-naphthopyrylospiran, and
1,3,3-trimethylindolino-6'-nitrobenzopyrylospiran.

The weight ratio of the aforementioned photochromic compound to the styrene-based oligomer is preferably 1:1 to 1:10000, and more preferably 1:5 to 1:500.

By satisfying the above-cited weight ratio, the effect of light fastness improvement is remarkable and simultaneously the photochromic compound exhibits a sufficient coloration density.

In the photochromic material comprising the aforementioned photochromic compound and styrene-based oligomer, an organic compound may be incorporated which has at least one functional groups each selected from the group consisting of a hydroxyl group, an ester group and a carboxyl group, has a boiling point of 150° C. or higher and a melting or softening point of 150° C. or lower in an amount not exceeding 50 parts by weight based on 100 parts by weight of the styrene-based oligomer.

By such incorporation, the discoloration times for coloration and decoloration can be controlled without deteriorating light fastness and coloration density.

As such an organic compound, an aliphatic monohydric alcohol having 8 or more carbon atoms, an aliphatic dihydric alcohol having 8 or more carbon atoms, an aromatic alcohol having 7 or more carbon atoms, an aliphatic ester having 7 or more carbon atoms, an aromatic ester having 7 or more carbon atoms, an aliphatic carboxylic acid having 6 or more carbon atoms, and an aromatic carboxylic acid having 6 or more carbon atoms are mentioned.

Specific examples for the aforementioned compound include alcohols such as, for example, n-octyl alcohol, n-decyl alcohol, n-undecyl alcohol, lauryl alcohol, n-dodecyl alcohol, myristyl alcohol, cetyl alcohol, stearyl alcohol, behenyl alcohol, octadecan-2-ol, cyclododecanol, hexane-1,6-diol, cholesterol, p-chlorobenzyl alcohol, p-methylbenzyl alcohol, ethylene glycol #4000, poly(ethylene glycol) #6000, oleyl alcohol, polyol (oligomers having a hydroxyl group) and rosin-based resin oligomer having a hydroxyl group [products of Arakawa Chemical Industries, Ltd., with trade names of Pine Crystal D-6011 and KR-1840]: esters such as, for example, n-octyl caproate, myristyl caproate, n-heptyl caprylate, n-butyl caprylate, n-butyl laurate, lauryl laurate, n-butyl myristate, myristyl myristate, n-amyl palmitate, methyl palmitate, stearyl palmitate, n-hexyl stearate, n-octyl stearate, stearyl stearate, cetyl stearate, n-butyl behenate, 2-ethylhexyl palmitate, 3-methylbutyl stearate, 2-methylpentyl behenate, neopentyl stearate, isobutyl stearate, stearyl pivalate, benzyl behenate, 4-methylbenzyl palmitate, cetyl benzoate, stearyl benzoate, stearyl phenoxyacetate, myristyl salicylate, stearyl 2-naphthoate, stearyl p-methoxybenzoate, cyclohexyl stearate, cholesteryl propionate, cholesteryl stearate, dimyristyl octamethylenedicarboxylate, dibutyl octamethylenedicarboxylate, dimyristyl adipate, distearyl adipate, dimyristyl sebacate, diethyl telephthalate, stearyl levulinate, tetrahydrofurfuryl stearate, n-butyl 12-hydroxystearate, butane-1,2,3,4-tetradodecyl ester, dilauryl malate, di-n-octyl tartarate, phenyl benzoate, benzyl benzoate, trilaurin, trimyristin, tristearin and acrylic resin oligomer having an ester group [products of Arakawa Chemical Industries, Ltd. with a trade name of Pine Crystal KE-100]: and carboxylic acids such as, for example, caproic acid, lauric acid, myristic acid, palmitic acid, stearic acid, behenic acid, erucic acid, 2-ethyl-hexadecanoic acid, p-tert-butylbenzoic acid, benzylic acid, p-aminobenzoic acid, 1,16-hexadecamethylenedicarboxylic acid, sebacic acid and a rosin-based resin oligomer having a carboxyl group (products of Arakawa Chemical Industries, Ltd. with trade names of Pine Crystal KE-604 and KR-85).

In the photochromic material of the invention, a hindered amine-based light stabilizer may be incorporated for the purpose of improving light fastness. As the hindered amine-based light stabilizer, a compound represented by the following formula (1) is preferable, but the invention is not limited to those compounds.

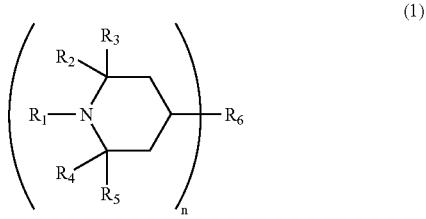

(1)

In the formula, $R_1$ represents an alkyl group having 1 to 30 carbon atoms, $R_2$, $R_3$, $R_4$ and $R_5$ each represents an alkyl group having 1 to 5 carbon atoms, n represents an integer not smaller than 1, and $R_6$ represents an n-valent organic residue.

Examples of the compound represented by formula (1) shown below,

Bis(1,2,2,6,6-pentamethyl-4-piperidyl) sebacate, bis(1,2,2,6,6-pentamethyl-4-piperidyl)2-(3,5-di-t-butyl-4-hydroxybenzyl)-2-n-butylmalonate, tetrakis((1,2,2,6,6-pentamethyl-4-piperidyl)1,2,3,4-butanetetracarboxylate, a mixed esterified product of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5,5]undecane, a mixed esterified product of 1,2,3,4-butanetetracarboxylic acid with 1,2,2,6,6-pentamethyl-4-piperidinol and 1-tridecanol, 1,2,2,6,6-pentamethyl-4-piperidyl methacrylate, N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine and N-methyl-3-dodecyl-1-(2,2,6,6-tetramethyl-4-piperidinyl)pyrrolidine-2,5-dione are mentioned.

The aforementioned photochromic material may be encapsulated in microcapsules to form a photochromic microcapsule pigment, or dispersed in a thermoplastic or thermosetting resin to form photochromic resin particles.

Meanwhile, the aforementioned microcapsules fulfill practical applicability with the average particle size of 0.5 to 100 μm, preferably 1 to 50 μm, and more preferably 1 to 30 μm.

The aforementioned microcapsules lack in dispersion stability and processing adaptability for the operation of blending into an ink, paint or thermoplastic resin, when the average particle size thereof exceeds 100 μm.

On the other hand, microcapsules with an average particle size not exceeding 0.5 μm exhibits difficulty in high-density coloration.

As the method of the aforementioned microencapsulation, there are the conventionally well-known interfacial polymerization based on an isocyanate compound, the in-situ polymerization based on a melamine-formalin system, liquid-phase hardening coating, phase separation from aqueous solution, phase separation from organic solvent, melt dispersion cooling, gas-phase suspension coating and spray drying. Any of them is appropriately selected depending on use application. In addition, on the surface of the microcapsules, another secondary resinous coating may be provided for practical use depending on the use purpose in order to impart durability or modify the surface property.

Meanwhile, by arbitrarily incorporating an ordinary dye or pigment in the photochromic material of the invention, a color change from a first colored state to a second colored state can be realized.

The aforementioned photochromic material and the microcapsule pigment or resin particles using the material can be used for photochromic fluid compositions such as, for example, printing inks for screen printing, offset printing, process printing, gravure printing, coater printing and tampo printing: paints for brush coating, spray coating, electrostatic coating, electro-deposition coating, flow coating, roller coating and immersion coating; inks for inkjet recording; inks for hand-writing or coating means such as those for marking pens, ballpoint pens, fountain pens, and brush-type pens; crayon, drawing colors, cosmetics and fabric-coloring fluids; by being dispersed in a vehicle containing a variety of additives according to need.

By way of precaution, a substrate to which the aforementioned photochromic fluid compositions attach is not specified, but any material can be effectively used including, for example, paper, synthetic paper, fabric, cloth, synthetic leather, leather, plastic, glass, china and porcelain, metal, wood and stone. The shape thereof is not restricted to a flat plane but may be a concavo-convex surface.

In a material in which a non-photochromic coloring layer (including images) is formed in advance on the aforementioned substrate, the aforementioned coloring layer can be hidden by masking whereby the color-changing mode can be made further versatile.

Further, the aforementioned photochromic material and the microcapsule pigment or resin particles using the material can be used as a photochromic molding resin composition by melt-blending with, for example, a thermoplastic resin, a thermosetting resin or a wax to fabricate into the forms of pellet, powder or paste.

With use of the aforementioned molding resin, photochromic molds can be obtained in the arbitrary forms of three-dimensional figurative product, film, sheet, plate, filament, rod-like matter and pipe by means of, for example, general-purpose injection molding, extrusion molding, blow molding or cast molding.

As the aforementioned additives, for example, a cross-linking agent, a hardener, a drying agent, a plasticizer, a viscosity controller, a dispersant, a UV absorber, an anti-oxidant, a light stabilizer, a sedimentation-preventing agent, a smoothing agent, a gelling agent, an anti-foaming agent, a delustrant agent, a penetrating agent, a pH adjusting agent, a foaming agent, a coupling agent, a moisturizer, a fungicide, an antiseptic and an anti-corrosion agent are mentioned.

On the laminated body or photochromic mold prepared by providing a substrate with a photochromic layer with use of the aforementioned fluid composition, a top coating may be provided to enhance durability.

The product using the aforementioned photochromic material and the microcapsule pigment or resin particles using the material specifically include, a doll or an animal-shaped toy, the hair for a doll or an animal-shaped toy, items accompanying dolls such as a doll house and furniture, cloth, a hat, a bag and shoes, accessory toys, stuffed toys, picture-drawing toys, picture books for toys, puzzle toys like a jigsaw puzzle, building blocks, block toys, clay toys, fluid toys, tops, kites, musical instrumental toys, cooking toys, gun toys, capturing toys, backdrop toys, toys simulating a riding vehicle, an animal, a plant, architecture and foodstuff, wearing goods such as a T-shirt, a trainer, a blouse, a dress, a swimming wear, raincoat, skiing wear, footwear such as shoes and shoe strings, cloth-made accessories such as a handkerchief, a towel and wrapping cloth, interior decoratives such as a carpet, a curtain, a curtain cord, a table cover, a rug, a cushion, a frame and an artificial flower, bedding such as a futon, a pillow and a mattress, accessories such as a finger ring, a arm ring, a tiara, an ear ring, a hair piece, a false nail, a ribbon and a scarf, stationary goods such as a hand-writing tool, a stamp, a rubber eraser, an underlay, a ruler and an adhesive tape, cosmetics such as a lipstick, an eye shadow, a manicure, a hair dye, a fake nail and a fake nail paint, kitchenware such as a cup, a dish, chopsticks, a spoon, a fork, a pan and a frying pan, a calendar, a label, a card, recording materials and various anticounterfeit printed matters, books such as a picture book, gloves, a necktie, a hat, a bag, a packaging vessel, embroidery yarn, sporting equipment, fishing goods, a toothbrush, a coaster, a clock, eye glasses, lighting equipment, an air conditioner, a musical instrument, a warmer, a cooling storage agent, a photo stand, bags such as a purse, an umbrella, furniture, a riding vehicle, architecture, a temperature-detecting indicator and teaching and learning tools.

EXAMPLES

Examples of the invention are described below, to which, however, the invention should not be limited.

Preparation of a Photochromic Material

In the case of Example 1, it is briefly described as follows.

One part by weight of 1,3,3-trimethyl-6-trifluoromethyl-indolino-6'-(1-piperidinyl)-spironaphthooxazine was dissolved uniformly into 10 parts by weight of a styrene-α-methylstyrene copolymer [a product of Riken Hercules Co., Ltd. with a trade name of Piccolastic A5, weight average molecular weight=317] under heating to give a photochromic material.

In the following table, the compositions of the photochromic materials in Example 1 to 24 are shown. By way of precaution, the figure in the parenthesis represents parts by weight.

TABLE 1

| Example | Photochromic compound | Additive |
|---|---|---|
| 1 | 1,3,3-trimethyl-6-trifluoromethyl-indolino-6'-(1-piperidinyl)-spiro naphthooxazine: Trade name = #5 Pink (1) | Styrene-α-methylstyrene copolymer (weight average molecular weight 317): Trade name = Piccolastic A-5 (10) |
| 2 | 1,3,3-trimethylindolino-spironaphthooxazine: Trade name = #1 Blue (1) | Styrene-α-methylstyrene copolymer (weight average molecular weight 317): Trade name = Piccolastic A-5 (10) |
| 3 | 1,3,3-trimethylindolino-6'-(1-piperidinyl) spironaphthooxazine: Trade name = #3 Purple (1) | Styrene-α-methylstyrene copolymer (weight average molecular weight 317): Trade name = Piccolastic A-5 (10) |
| 4 | 1,3,3-trimethyl-6-trifluoromethyl-indolino-6'-(1-piperidinyl)-spiro naphthooxazine: Trade name = #5 Pink (1) | Styrene-α-methylstyrene copolymer (weight average molecular weight 917): Trade name = Piccolastic A-75 (10) |
| 5 | 1,3,3-trimethyl-6-trifluoromethyl-indolino-6'-(1-piperidinyl)-spiro naphthooxazine: Trade name = #5 Pink (1) | Low molecular weight polystyrene (weight average molecular weight 2000): Trade name = Himer SB-75 (10) |
| 6 | 1,3,3-trimethyl-6-trifluoromethyl-indolino-6'-(1-piperidinyl)-spiro naphthooxazine: Trade name = #5 Pink (1) | Low molecular weight polystyrene (weight average molecular weight 4000): Trade name = Himer ST-95 (10) |
| 7 | 1,3,3-trimethyl-6-trifluoromethyl-indolino-6'-(1-piperidinyl)-spiro naphthooxazine: Trade name = #5 Pink (1) | α-Methylstyrene copolymer (weight average molecular weight 664): Trade name = Crystalex 3085 (10) |
| 8 | 1,3,3-trimethyl-6-trifluoromethyl-indolino-6'-(1-piperidinyl)-spiro naphthooxazine: Trade name = #5 Pink (1) | α-Methylstyrene copolymer (weight average molecular weight 3950): Trade name = Crystalex 5140 (10) |
| 9 | 1,3,3-trimethyl-6-trifluoromethyl-indolino-6'-(1-piperidinyl)-spiro naphthooxazine: Trade name = #5 Pink (1) | α-Methylstyrene-vinyltoluene copolymer (weight average molecular weight 1740): Trade name = Piccotex 100 (10) |
| 10 | 1,3,3-trimethyl-6-trifluoromethyl-indolino-6'-(1-piperidinyl)-spiro naphthooxazine: Trade name = #5 Pink (1) | α-Pinene copolymer (weight average molecular weight 833): Trade name = Piccolite A 115 (10) |
| 11 | 1,3,3-trimethyl-6-trifluoromethyl-indolino-6'-(1-piperidinyl)-spiro naphthooxazine: Trade name = #5 Pink (1) | β-Pinene copolymer (weight average molecular weight 1710): Trade name = Piccolite S 115 (10) |
| 12 | 1,3,3-trimethyl-6-trifluoromethyl-indolino-6'-(1-piperidinyl)-spiro naphthooxazine: Trade name = #5 Pink (1) | α-Methylstyrene-vinyltoluene copolymer (weight average molecular weight 950): Trade name = Piccotex LC (10) |

TABLE 2

| Example | Photochromic compound | Additive | |
|---|---|---|---|
| 13 | 1,3,3-trimethyl-6-trifluoromethyl-indolino-6'-(1-piperidinyl)-spironaphthooxazine: Trade name = #5 Pink (1) | Styrene-α-methylstyrene copolymer (weight average molecular weight 317): Trade name = Piccolastic A-5 (5) | Low molecular weight polystyrene (weight average molecular weight 2000): Trade name = Himer SB-75 (5) |
| 14 | 1,3,3-trimethyl-6-trifluoromethyl-indolino-6'-(1-piperidinyl)-spironaphthooxazine: Trade name = #5 Pink (1) | Styrene-α-methylstyrene copolymer (weight average molecular weight 317): Trade name = Piccolastic A-5 (10) | Bis(1,2,2,6,6-pentamethyl-4-piperidyl sebacate): Trade name = Sanol LS 765 (1) |

TABLE 2-continued

| Example | Photochromic compound | Additive | |
|---|---|---|---|
| 15 | 1,3,3-trimethy1-6-trifluoromethyl-indolino-6'-(1-piperidinyl)-spironaphthooxazine: Trade name = #5 Pink (1) | Low molecular weight polystyrene (weight average molecular weight 2000): Trade name = Himer-SB-75 (10) | Bis(1,2,2,6,6-pentamethyl-4-piperidyl sebacate): Trade name = Sanol LS 765 (1) |
| 16 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 317): Trade name = Piccolastic A-5 (10) | Bis(1,2,2,6,6-pentamethyl-4-piperidyl)[[3,5-bis(1,1-dimethylethyl)-4-hydroxyphenyl]methyl] butyl malonate: Trade name = Tinuvin 144 (1) |
| 17 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 317): Trade name = Piccolastic A-5 (10) | Tetrakis(1,2,2,6,6-pentamethyl-4-piperidyl)-1,2,3,4-butane tetracarboxylate: Trade name = Adeca-stab LA-52 (1) |
| 18 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 917): Trade name = Piccolastic A-75 (10) | Bis(1,2,2,6,6-pentamethyl-4-piperidyl sebacate): Trade name = Sanol LS 765 (3) n-dodecyl alcohol (2) |
| 19 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 917): Trade name = Piccolastic A-75 (10) | Bis(1,2,2,6,6-pentamethyl-4-piperidyl sebacate)): Trade name = Sanol LS 765 (3) Rosin-containing diol: Trade name = Pine Crystal D-6011 (2) |
| 20 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 917): Trade name = Piccolastic A-75 (10) | Stabilized rosin ester Trade name = Pine Crystal KE-100 (3) |
| 21 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 917): Trade name = Piccolastic A-75 (10) | Bis(1,2,2,6,6-pentamethyl-4-piperidyl sebacate): Trade name = Sanol LS 765 (3) Stabilized rosin Trade name = Pine Crystal KR-85 (2) |
| 22 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 917): Trade name = Piccolastic A-75 (10) | Bis(1,2,2,6,6-pentamethyl-4-piperidyl sebacate): Trade name = Sanol LS 765 (3) Butyl palmitate (2) |
| 23 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 917): Trade name = Piccolastic A-75 (10) | Bis(1,2,2,6,6-pentamethyl-4-piperidyl sebacate): Trade name Sanol LS 765 (3) Palmitic acid (2) |
| 24 | 1,3,3-trimethy1-6-trifluoromethyl-indolino-6'-(1-piperidinyl)-spironaphthooxazine: Trade name = #5 Pink (1) | Styrene-α-methylstyrene copolymer (weight average molecular weight 917): Trade name = Piccolastic A-75 (10) | Bis(1,2,2,6,6-pentamethyl-4-piperidyl sebacate): Trade name = Sanol LS 765 (3) Undecanol 12-hydroxystearate (2) |

In the following table, the compositions of the photochromic materials in Comparative Examples 1 to 12 are shown. By way of precaution, the figure in the parenthesis represents parts by weight.

TABLE 3

| Comparative Example | Photochromic compound | Additive | |
|---|---|---|---|
| 1 | 1,3,3-trimethy1-6-trifluoromethyl-indolino-6'-(1-piperidinyl)-spironaphthooxazine: Trade name = #5 Pink (1) | | |
| 2 | 1,3,3-trimethy1indolino-spironaphthooxazine: Trade name = #1 Blue (1) | | |
| 3 | 1,3,3-trimethy1indolino-6'-(1-piperidinyl)-spironaphthooxazine: Trade name = #3 Purple (1) | | |
| 4 | 1,3,3-trimethy1-6-trifluoromethyl-indolino-6'-(1-piperidinyl)-spironaphthooxazine: Trade name = #5 Pink (1) | Mixed esterified product of 1,2,3,4-butanetetracarboxylic acid, 2,2,6,6-tetramethyl-4-piperidinol and 3,9-bis(2-hydroxy-1,1-dimethylethyl)-2,4,8,10-tetraoxaspiro[5.5]undecane: Trade name = Adeca-stab LA-68 (1) | Distearylpentaerythritol diphosphite: Trade name = JPP-2000PT (1) |
| 5 | 1,3,3-trimethy1-6-trifluoromethyl-indolino-6'-(1-piperidinyl)-spironaphthooxazine: Trade name = #5 Pink (1) | Mixed esterified product of 1,2,3,4-butanetetracarboxylic acid, 2,2,6,6-tetramethyl-4-piperidinol and 3,9-bis(2-hydroxy-1,1-dimethylethyl)-2,4,8,10-tetraoxaspiro[5.5]undecane: Trade name = Adeca-stab LA-68 (1) | Bis(tridecyl)pentaerythritol diphosphite: Trade name = JPP-13R (1) |
| 6 | 1,3,3-trimethy1indolino-spironaphthooxazine: Trade name = #1 Blue (1) | Mixed esterified product of 1,2,3,4-butanetetracarboxylic acid, 2,2,6,6-tetramethyl-4-piperidinol and 3,9-bis(2-hydroxy-1,1-dimethylethyl)-2,4,8,10-tetraoxaspiro[5.5]undecane: Trade name = Adeca-stab LA-68 (1) | N-Nitrosophenyl hydroxylamine Al salt (1) |
| 7 | 1,3,3-trimethy1indolino-spironaphthooxazine: Trade name = #1 Blue (1) | 1,4-Diazabicyclo[2,2,2]octane (1) | |

TABLE 3-continued

| Comparative Example | Photochromic compound | Additive |
|---|---|---|
| 8 | 1,3,3-trimethyl-6-trifluoromethyl-indolino-6'-(1-piperidinyl)-spironaphthooxazine: Trade name = #5 Pink (1) | Bis(1,2,2,6,6-pentamethyl-4-piperidyl sebacate): Trade name = Sanol LS 765 (1) |
| 9 | 1,3,3-trimethyl-6-trifluoromethyl-indolino-6'-(1-piperidinyl)-spironaphthooxazine: Trade name = #5 Pink (1) | Polystyrene (polymer): Trade name = Stylon 666 (10) |
| 10 | 1,3,3-trimethyl-6-trifluoromethyl-indolino-6'-(1-piperidinyl)-spironaphthooxazine: Trade name = #5 Pink (1) | Mixed esterified product of 1,2,3,4-butanetetracarboxylic acid, 2,2,6,6-tetramethyl-4-piperidinol and 3,9-bis(2-hydroxy-1,1-dimethylethyl)-2,4,8,10-tetraoxaspiro[5.5]undecane: Trade name = Adeca-stab LA-68 (1) |
| 11 | 1,3,3-trimethyl-6-trifluoromethyl-indolino-6'-(1-piperidinyl)-spironaphthooxazine: Trade name = #5 Pink (1) | Acrylic resin: Trade name = Dianal BR 83 (10) |
| 12 | 1,3,3-trimethyl-6-trifluoromethyl-indolino-6'-(1-piperidinyl)-spironaphthooxazine: Trade name #5 Pink (1) | Styrene monomer (10) |

Preparation of Test Samples

Each of the photochromic materials of Examples 1 to 10, 12 to 24 and Comparative Examples 1 to 12 prepared as described above was dissolved in 100 parts of methyl ethyl ketone. The resulting solution was coated on a piece of a white synthetic paper by means of a bar coater so as to give a wet film thickness of 90 μm. A test sample was obtained by drying the coated piece.

With respect to the photochromic material of Example 11, the material was dissolved in 100 parts of toluene, and the resulting solution was coated on a piece of the white synthetic paper by means of a bar coater so as to give a wet film thickness of 90 μm. A test sample was obtained by drying the coated piece.

Initial Coloration Density Test

After each of the aforementioned test samples was irradiated with a light source [a bulb-shaped fluorescent lamp made by Toshiba Lighting & Technology, Corp. with a trade name of Neoball 5 Black Light EFD15BLB] placed 10 cm apart from the sample for one min, the luminance value (converted from Y value) was measured by means of a color-difference meter [TC-3600 made by Tokyo Denshoku Co., Ltd.].

By way of precaution, the larger the luminance value is, the lower is the color density. And the smaller the luminance value is, the higher is the color density.

Initial Decoloration Speed Test

Each test sample, having subjected to the same light irradiation as in the afore mentioned initial coloration density test, was immediately left in darkness (25° C.), and the time in which the color density returned to the value prior to the light irradiation was measured.

Just to be sure, the measurement was conducted indoors (25° C., 300 lux illuminance) every 1 min to confirm the degree of recovery.

Light Fastness Test

After each test sample was subjected to light irradiation at 140000 lux for 1, 2, 3, 4 and 5 hr by means of a desk-top type light fastness tester (SUNTEST CPS made by Heraeus K. K.), the luminance value was measured with the aforementioned color-difference meter.

In the following table 4, the results of the initial coloration density test, initial decoloration speed test and light fastness test are shown for each test sample.

TABLE 4

| | Initial coloration density | Initial decoloration speed | Light fastness test | | | | |
|---|---|---|---|---|---|---|---|
| | | | 1 hr | 2 hr | 3 hr | 4 hr | 5 hr |
| Example | | | | | | | |
| 1 | 7.3 | 2 min | A | B | C | D | E |
| 2 | 7.5 | 1 min or less | A | A | A | B | B |
| 3 | 7.1 | 1 min or less | A | A | A | B | B |
| 4 | 6.9 | 60 min | A | B | C | D | E |
| 5 | 6.9 | 60 min | A | A | B | D | E |
| 6 | 5.0 | 60 min | A | A | A | B | C |
| 7 | 7.5 | 15 min | A | A | A | B | C |
| 8 | 7.4 | 5 min | A | A | A | B | C |
| 9 | 7.5 | 5 min | A | B | C | D | D |
| 10 | 7.2 | 5 min | B | C | D | D | E |
| 11 | 6.1 | 15 min | B | C | C | D | E |
| 12 | 7.0 | 15 min | A | B | C | D | D |
| 13 | 6.6 | 4 min | A | A | B | C | D |
| 14 | 7.5 | 1 min or less | A | A | A | B | B |
| 15 | 6.5 | 10 min | A | A | A | B | B |
| 16 | 7.7 | 1 min or less | A | A | A | B | B |
| 17 | 7.3 | 2 min | A | A | A | B | B |
| 18 | 6.9 | 1 min or less | A | B | C | D | E |
| 19 | 7.1 | 45 min | A | B | C | D | E |
| 20 | 7.0 | 60 min | A | B | C | D | E |
| 21 | 7.1 | 60 min | A | B | C | D | E |
| 22 | 7.0 | 45 min | A | B | C | D | E |
| 23 | 7.3 | 1 min or less | A | B | C | D | E |
| 24 | 7.3 | 45 min | A | B | C | D | E |
| Comparative Example | | | | | | | |
| 1 | 7.7 | 1 min or less | D | E | E | E | E |
| 2 | 7.7 | 10 min | E | E | E | E | E |
| 3 | 7.3 | 1 min or less | D | E | E | E | E |
| 4 | 7.2 | 15 min | E | E | E | E | E |
| 5 | 6.6 | 10 min | A | C | D | E | E |
| 6 | 8.1 | 4 min | A | C | D | E | E |
| 7 | 7.8 | 1 min or less | A | C | D | E | E |
| 8 | 7.4 | 1 min or less | A | A | B | B | B |
| 9 | 7.7 | 60 min or more | A | A | B | C | D |
| 10 | 7.2 | 60 min | A | A | C | D | E |
| 11 | 7.7 | 60 min or more | A | A | B | C | D |
| 12 | 7.8 | 2 minutes | A | D | E | E | E |

The symbols in the table used for the evaluation of the light fastness test represent the following results.
A: The sample keeps a color density of 100 to 80% in comparison with the initial value.
B: The sample keeps a color density of 80 to 60% in comparison with the initial value.
C: The sample keeps a color density of 60 to 40% in comparison with the initial value.
D: The sample keeps a color density of 40 to 20% in comparison with the initial value.
E: The sample keeps a color density of 20 to 0% in comparison with the initial value.

Application Example 1

Twelve parts of the photochromic material prepared in Example 14 was blended with 100 parts of a SBS-based thermoplastic elastomer compound [a product of Aronkasei Co., Ltd. with a trade name of AR130]. The mixture was fabricated into a rod-shaped photochromic mold product by extrusion molding.

The thus obtained mold product looked milky white prior to exposure to sunlight. With exposure to sunlight, a pink color developed. Thereafter, when it was left indoors for a while, the pink color disappeared and returned to the original milky white appearance.

These color changes could be conducted repeatedly.

Application Example 2

Pellets were prepared by mixing 11 parts of the photochromic material obtained in Example 5 and 0.01 part of a copper phthalocyanine-based blue pigment with 100 parts of a high-density polyethylene [a product of Nippon Polyolefin Co., Ltd. with a trade name of KB145N].

By using the pellets thus prepared, a photochromic mold product in the shape of a container was produced by blow molding.

The mold product, which was blue prior to exposure to sunlight, turned violet with exposure to sunlight. By leaving the mold indoors for a while, the violet color disappeared returning to the initial blue appearance.

These color changes could be conducted repeatedly.

Application Example 3

Sixty parts of the photochromic material prepared in Example 16 was mixed in a mixed solution comprising 20 parts of an aromatic isocyanate pre-polymer as a film-forming material and 20 parts of ethyl acetate. Then, the resulting mixture was added in 100 parts of 15% aqueous gelatin solution dropwise in such a manner as to give rise to minute drops under stirring. The system was kept at 70° C. for one hr to undergo reaction.

Next, stirring was continued for additional 3 hr under keeping the fluid temperature at 90° C. to prepare a microcapsule dispersion. Thereafter, microcapsules were obtained by centrifugal separation.

The above-described microcapsules were dried by spray drying. Ten parts of the dried product was separated and homogeneously dispersed in a 15% xylene solution of an acrylic resin [a product of Rohm & Haas Co. with a trade name of Palaroid B-72], followed by dilution with xylene and methyl isobutyl ketone. In this way, a paint was obtained.

The above-described paint was coated on a sheet made of a soft poly(vinyl chloride) with a thickness of 200 μm by means of a spray gun to provide a product coated with a photochromic coating.

The coated product thus prepared, which was white prior to exposure to sunlight, turned pink with exposure to sunlight. Then, by leaving the mold product indoors for a while, the pink color disappeared returning to the initial white appearance.

These color changes could be conducted repeatedly.

Application Example 4

The photochromic material obtained in Example 2 was uniformly melted, which is to be used as an inclusion fluid.

Separately, to 100 parts of a 10% aqueous solution of an ethylene-maleic anhydride copolymer (a product of Monsanto Chemical, USA with a trade name of EMA-31, molecular weight of 75000 to 90000) 10 parts of urea, 1 part of resorcin and 55 parts of water were added. After the pH of the solution was adjusted to 3.5 by adding a 20% aqueous sodium hydroxide solution, 50 parts of the above-described inclusion fluid was poured while stirring and emulsified until the average particle size of the oil droplets becomes about 3 μm.

Encapsulation reaction was conducted by adding 25 parts of 37% aqueous formaldehyde solution to the aforementioned solution and leaving the system for 2 hr with the adjustment of temperature at 65° C.

By subjecting the resulting solution to centrifugal separation, about 150 parts of a water-containing microcapsule slurry was collected.

Seventy-five parts of the dried product obtained by dehydrating the above-prepared microcapsule slurry were mixed with 750 parts. of a middle-low pressure polyethylene [a product of Showa Denko K. K. with a trade name of Shorex 6050]. And the resulting mixture was extruded by means of a extrusion molding machine at 160-170° C., and pelletized with a pelletizer to obtain pellets.

With use of the aforementioned pellets, a photochromic mold product of 1 mm thickness was produced with use of an injection-molding machine under temperature setting at 160-170° C.

The resulting mold product, which was white prior to exposure to sunlight, turned blue with exposure to sunlight. Then, by leaving the mold indoors for a while, the blue color disappeared returning to the initial white appearance.

These color changes could be conducted repeatedly.

While the invention has been described in detail and with reference to specific embodiments thereof, it will be apparent to one skilled in the art that various changes and modifications can be made therein without departing from the scope thereof.

This application is based on Japanese patent application No. 2003-275721 filed on Jul. 17, 2003, and Japanese patent application No. 2004-155787 filed on May 26, 2004 the entire contents thereof being hereby incorporated by reference.

What is claimed is:

1. A photochromic material comprising a mixture of a styrene-based oligomer having a weight average molecular weight of from 200 to 6000 and a photochromic compound selected from the group consisting of spirooxazine derivatives and spiropyran derivatives, wherein the photochromic compound is dissolved in the styrene-based oligomer.

2. The photochromic material according to claim 1, wherein the weight ratio of said photochromic compound to the styrene-based oligomer lies between 1:1 and 1:10000.

3. The photochromic material according to claim 1, wherein the weight average molecular weight of said styrene-based oligomer is from 200 to 4000.

4. The photochromic material according to claim 1, which further comprises an organic compound which has at least one functional groups each selected from the group consisting of a hydroxy group, an ester group and a carboxyl group, wherein the boiling point of the organic compound is 150° C. or higher, and the melting point or a softening point of the organic compound does not exceed 150° C., and wherein the organic compound is incorporated in the styrene-based oligomer in an amount of 50 parts by weight based on 100 parts by weight of the oligomer.

5. The photochromic material according to claim 1, which further comprises a hindered amine-based light stabilizer.

6. The photochromic material according to claim 5, wherein said hindered amine-based light stabilizer is a compound represented by the following formula (1):

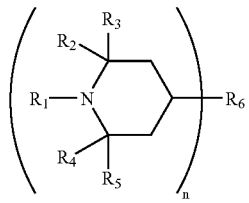

wherein, $R_1$ represents an alkyl group having 1 to 30 carbon atoms, $R_2$, $R_3$, $R_4$ and $R_5$ each represents an alkyl group having 1 to 5 carbon atoms, n represents an integer not smaller than 1, and $R_6$ represents an n-valent organic residue.

7. The photochromic material according to claim 1, wherein said photochromic compound and styrene-based oligomer are encapsulated in microcapsules.

8. The photochromic material according to claim 1, wherein said photochromic compound and styrene-based oligomer are dispersed in resin particles.

* * * * *